United States Patent Office 3,485,046
Patented Dec. 23, 1969

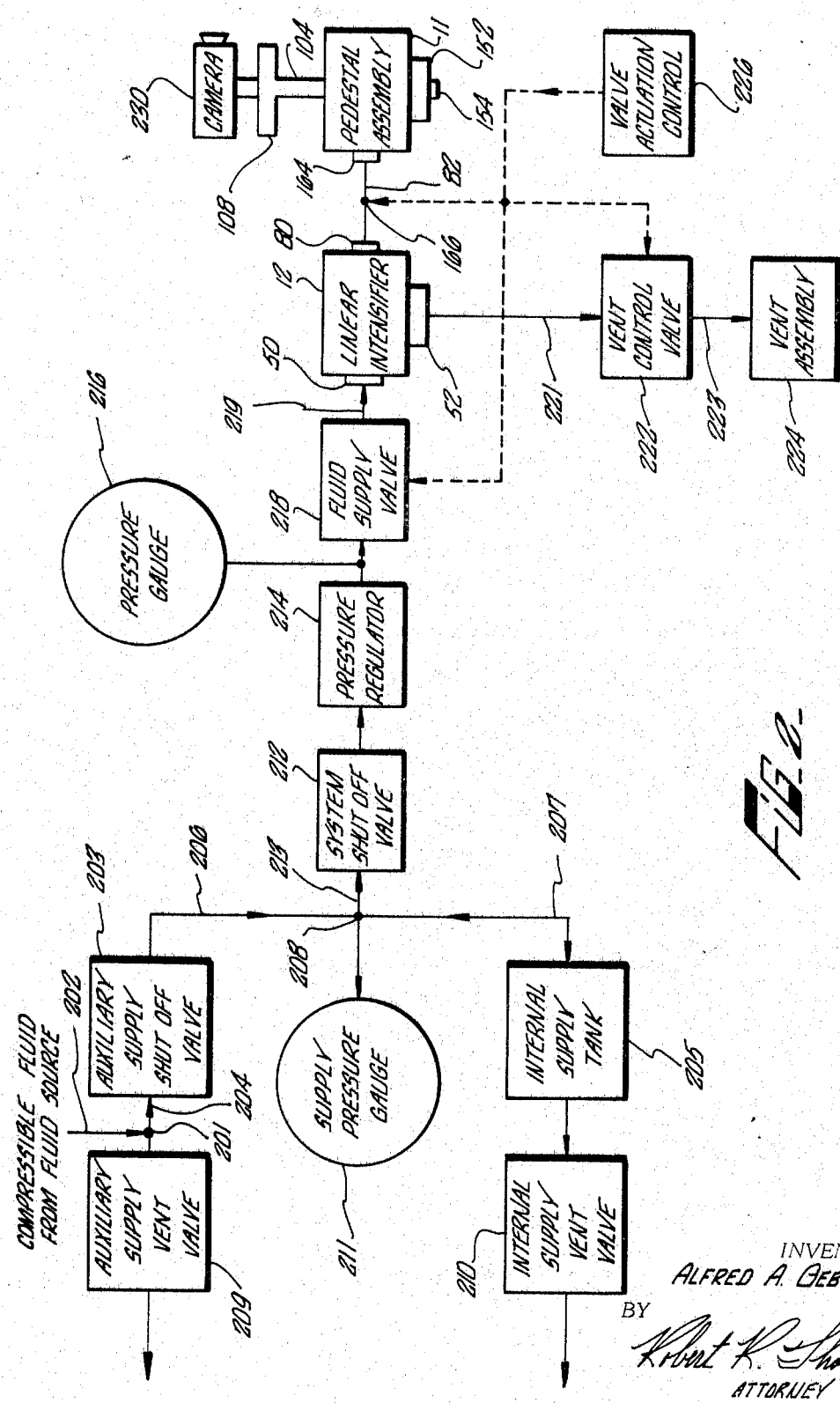

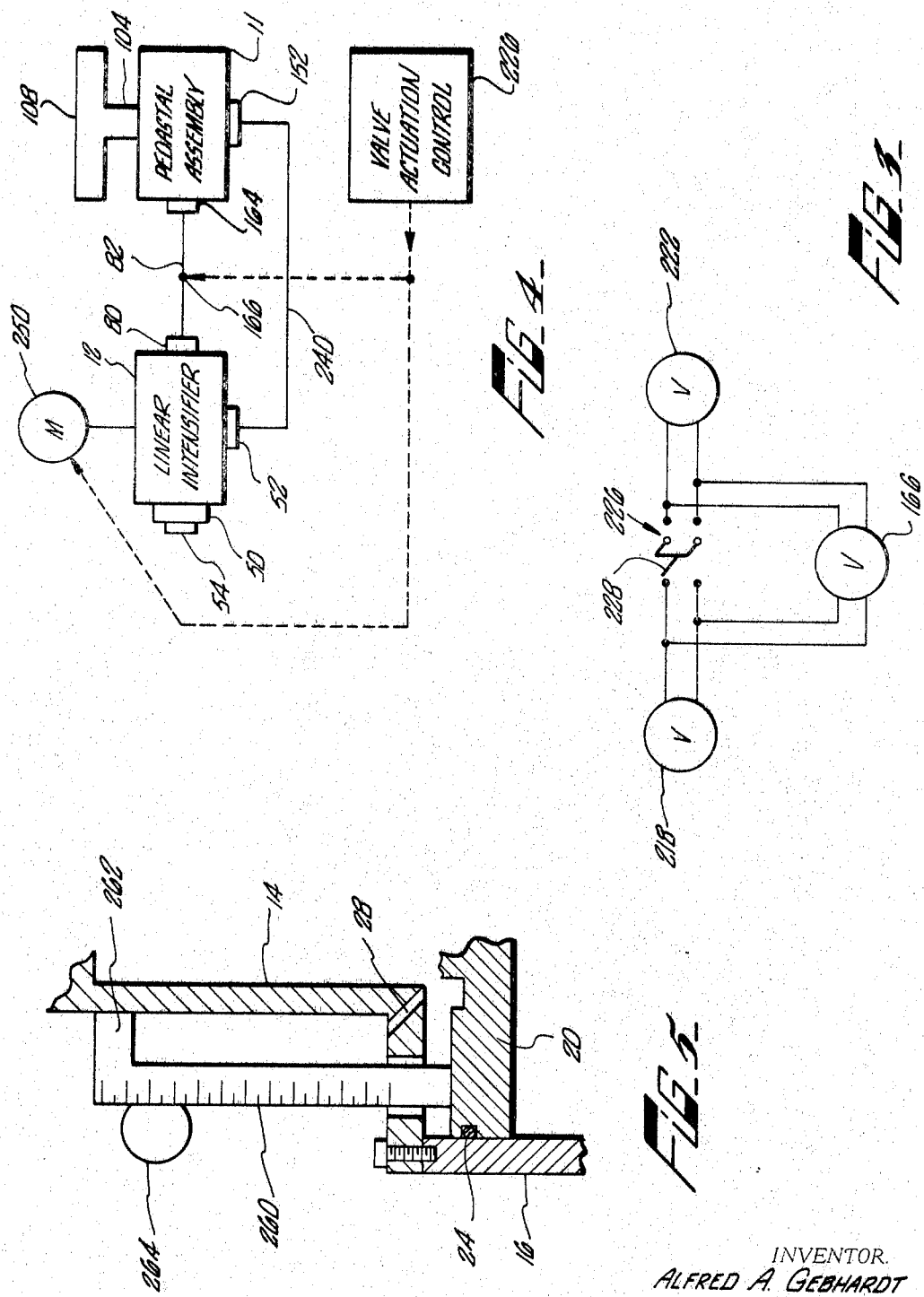

3,485,046
MOVABLE PEDESTAL
Alfred A. Gebhardt, Los Angeles, Calif., assignor to Del Mar Engineering Laboratories, Los Angeles, Calif., a corporation of California
Filed Sept. 1, 1967, Ser. No. 665,058
Int. Cl. F15b *15/14, 7/00*
U.S. Cl. 60—52                                                10 Claims

ABSTRACT OF THE DISCLOSURE

A pedestal on wheels in which the height of the riser column is controlled by fluid pressure.

---

An apparatus for moving or positioning a device, such as a television camera, by utilizing a combination of compressible and hydraulic fluids. Hydraulic fluid pressure generated in a first assembly is transmitted to a piston in a second assembly to move the piston. The device is connected to the piston. Piston movement is opposed by compressible fluid pressure, so that the piston moves in response to a pressure differential. The fluid pressure differential is generated either externally or internally.

For the purpose of explaining the invention, it will be related as to its arrangements for a television camera pedestal used to set the camera at different heights during shooting sequences. Existing television camera pedestals are essentially one of three types:

(1) A mechanical arrangement using an electric motor driven cable and which to raise and lower the riser column. This method is noisy and expensive to maintain. Occasional cable breakage results in the dropping of the expensive camera equipment.

(2) Use of a large volume, low pressure compressible fluid container to supply compressible fluid directly to the bottom of a riser column in a precharged amount adequate to balance the weight of the particular camera mounted on the column. This arrangement requires frequent changing of the pressure range to balance the particular camera being used. Raising and lowering is achieved by the camera operator manually lifting or pushing down to position the column. Any small amount of compressible fluid pressure loss from leakage can cause the system to be too difficult for the camera operator to raise during a shooting sequence.

(3) A mechanical arrangement using weights, generally lead to counterbalance the weight of the camera, and connecting the weights to a riser column by cable and pulleys. The force for moving the riser column up and down is supplied manually by the camera operator. The dead weight of the counterbalance makes the pedestal too heavy to roll from position to position easily. Cable breakage allows the camera to drop and be damaged, and different camera weights and lens changes require frequent addition and removal of weights to achieve a balance between the camera mounted on the riser column and the balance weights.

According to the present invention, a small volume of compressible fluid under high pressure is utilized, in conjunction with hydraulic fluid, to control the movement of the riser column. Hydraulic fluid is transferred from a pressure control assembly, referred to hereinafter as a linear intensifier, to the riser column and associated components, called hereinafter the pedestal assembly. Various means are utilized to control the pressure existing in the hydraulic fluid, so as to control motion of the riser column, basically utilizing the generation of a pressure differential to produce movement of the riser column. The linear intensifier is a dual cylinder assembly, divided into a compressible fluid chamber and a hydraulic fluid chamber. Hydraulic fluid is transferred between the linear intensifier and the pedestal assembly. Hydraulic fluid in the pedestal assembly is in contact with a riser column piston, movement of which is controlled by the overall pressure differential to move the riser column as desired. The pressure of the compressible fluid in the compressible fluid chamber is utilized to produce the pressure differential. In certain embodiments, a compressible fluid storage space is provided in the pedestal assembly, which is in communication with the compressible fluid chamber of the linear intensifier, and a constant total volume of compressible fluid is maintained by means of this communication.

The invention may be more readily understood by referring to the accompanying drawing, in which:

FIGURE 2 is a block diagram illustrating a complete embodiment of the invention which may be utilized, for example, as a television camera pedestal;

FIGURE 3 is a schematic diagram of the valve control system in one embodiment of the invention;

FIGURE 4 is a block diagram of an embodiment of the invention utilizing a closed compressible fluid system and an electric drive motor in order to position the pedestal assembly; and FIGURE 5 is a partial sectional view of the drive mechanism for the embodiment illustrated in FIGURE 4.

Figure 1:
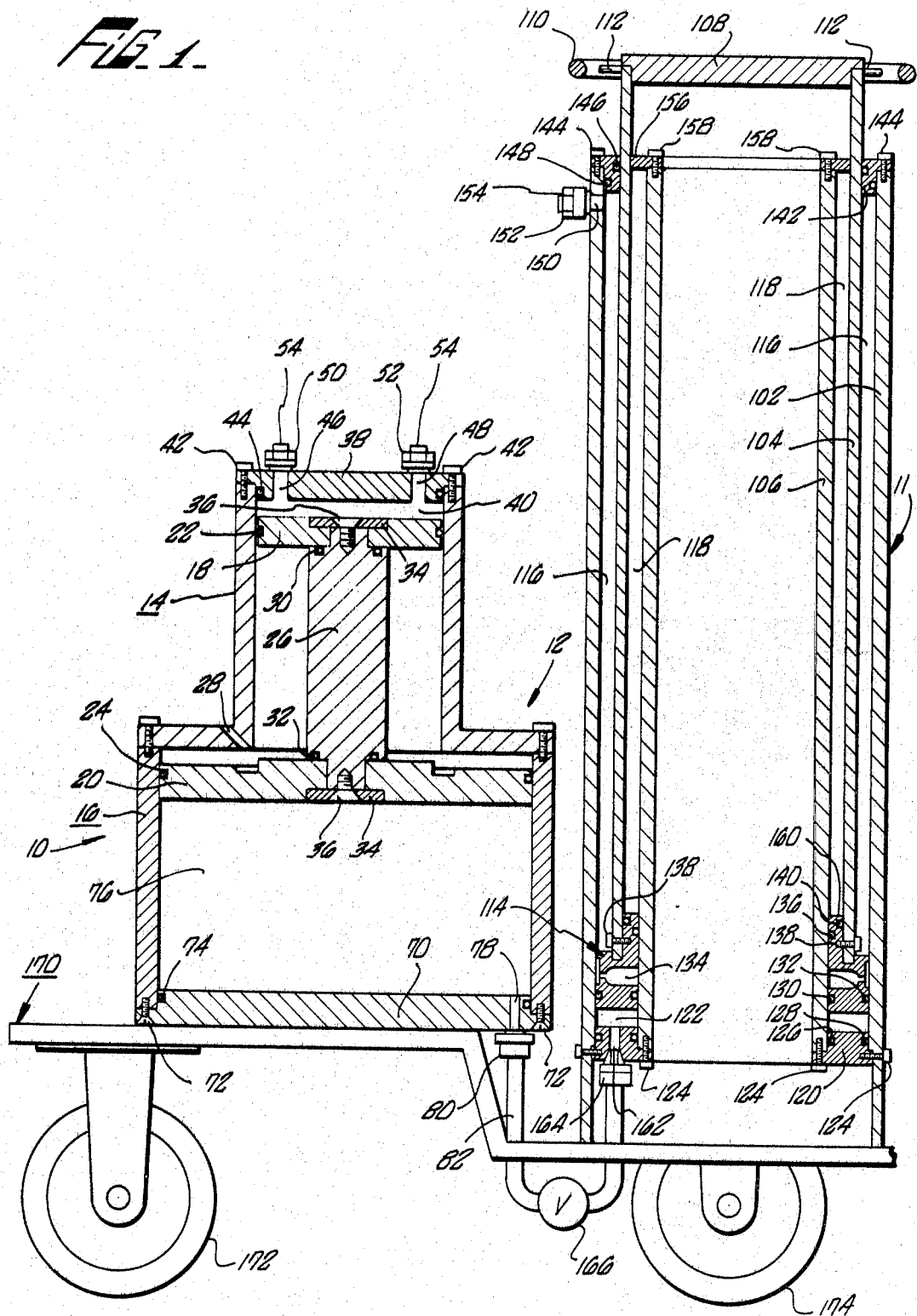
FIGURE 1 is a sectional view of the linear intensifier and pedestal assembly which constitute the principal components of the invention.

Referring now to FIGURE 1, there is shown a sectional view of an assembly 10 which includes a pedestal assembly 11 and a linear intensifier 12. The linear intensifier 12 consists of an upper body cylinder assembly 14 and a lower body cylinder assembly 16. Disposed within the upper body cylinder assembly 14 is a compressible fluid piston 18, and disposed within the lower body cylinder assembly 16 is a hydraulic fluid piston 20. The compressible fluid piston 18 is sealed against the inner wall of the upper body cylinder assembly 14 by an O-ring 22 which is disposed in a recess formed in the periphery of the piston 18. Similarly, the hydraulic fluid piston 20 is sealed by an O-ring 24. The compressible piston and hydraulic fluid piston are connected together by a linear intensifier transfer shaft 26, and the space between the pistons 18, 20 is vented to the atmosphere through a vent 28. Seals between the linear transfer shaft 26 and the compressible fluid piston 18 and hydraulic fluid piston 20 are formed by means of O-rings 30 and 32, respectively. Attachment of the linear intensifier transfer shaft to the pistons 18, 20 is accomplished by means of a pair of piston washers 34 and piston screws 36. The upper body cylinder assembly terminates in a compressible fluid chamber head 38, so that a compressible fluid chamber 40 is formed between the chamber head 38 and the piston 18. The compressible fluid chamber head 38 is attached to the upper body cylinder assembly 14 by attaching screws 42, and an O-ring 44 disposed in a recess formed in the chamber head 38 seals the compressible fluid chamber in conjunction with the O-ring 22 disposed about the compressible fluid piston 18. In the particular embodiment shown in FIGURE 1, the compressible fluid chamber head 38 has a compressible fluid inlet pasage 46 and a compressible fluid transfer passage 48 formed therein. The compressible fluid inlet passage and compressible fluid transfer passage are each provided with threaded pressure fittings 50, 52, respectively. The fittings 50, 52 are shown as closed by caps 54 for purposes of illustration. As will become apparent hereinafter, the fittings 50, 52 are utilized in conjunction with compressible fluid lines in various embodiments of the invention. Therefore, the caps 54 shown in FIGURE 1 are to be understood to be shown for illustrative purposes only, as indicating that either one or both of the passages 46, 48 may be eliminated in particular embodiments of the invention, or both the passages 46, 48 may be simultaneously utilized.

The lower body cylinder assembly 16 terminates in a hydraulic fluid chamber head 70 which is attached to the lower body cylinder assembly by means of attaching screws 72 and sealed to the lower body cylinder assembly by means of an O-ring 74 so as to form a hydraulic fluid chamber 76. A hydraulic fluid transfer passage 78 is formed in the hydraulic fluid chamber head 70, and terminates in a threaded pressure fitting 80, to which is attached a hydraulic fluid transfer line 82.

The pedestal assembly 11 consists principally of three concentrically disposed cylinders which are: an outer cylinder 102, a riser column 104 and an inner cylinder 106. The riser column 104 terminates in a pedestal or load support plate 108, to which a direction of movement control ring 110 is attached by a series of spokes 112. If desired, means may be provided to operate, in conjunction with the ring 110, and interconnected with wheels 172, 174, to turn the wheels and thus control the direction of motion of the entire device, when the device is moved from place to place. At its opposite end from the load support plate 108, the riser column 104 terminates in a riser column piston 114, of generally annular configuration. The riser column piston 114 is seen to support the riser column 104 between the outer cylinder 102 and the inner cylinder 106, so as to form a pair of cylindrical spaces on either side of the riser column, which spaces are hereinafter referred to as the compressible fluid storage space 116 and the atmospheric vented space 118. The inner and outer cylinders 106, 102 are connected together, at their lower ends, by a lower head 120, of annular configuration, so that a hydraulic fluid working space 122 is formed between the main riser column lower head and the riser column piston. The pedestal assembly 11 thus contains three fluid chambers. The lower head is attached to the inner and outer cylinders by attaching screws 124 and sealed by means of an inner O-ring 126 and an outer O-ring 128. The riser column piston is similarly sealed by an inner O-ring 130 and an outer O-ring 132 so as to seal the hydraulic fluid working space 122. The riser column piston 114 has an inner aperture 134 formed therein, which communicates with the compressible fluid storage space 116 by not having a seal formed in the wall of the riser column piston between the aperture 134 and the compressible fluid storage space 116. In order to seal the aperture 134 from the atmospheric vented space 118, an O-ring 136 is disposed in a recess in the riser column piston 114 so as to form a seal with the inner cylinder 106. Attaching screws 138 connect the riser column 104 to the riser column piston 114, and an O-ring 140 forms a seal between the riser column 104 and the riser column piston 114, with respect to the atmospheric vented space 118. Thus, it will be apparent that the pressure of compressible fluid which exists in the compressible fluid storage space 116 will also exist in the aperture 134. The compressible fluid storage space is sealed, at its upper end, by means of a main riser column body upper head 142, which is attached to the main riser column body outer cylinder 102 by attaching screws 144. The seal between the main riser column body upper head 142 and the riser column 104 is formed by an inner O-ring 146 disposed in a recess in the main riser column body upper head. The seal between the main riser column body upper head 142 and the outer cylinder 102 is formed by an outer O-ring 148 disposed in a recess in the main riser column body upper head. These seals are not utilized in one elementary embodiment of the invention, which is discussed hereinafter. A compressible fluid transfer passage 150 is formed in the outer cylinder 102 adjacent the main riser column body upper head 142. A threaded pressure fitting 152 is fitted into the compressible fluid transfer passage 150 and is closed by means of a cap 154. For the particular embodiment, when desired, the cap is removed and a compressible fluid line is attached to the threaded pressure fitting 152. Of course, if the compressible fluid transfer passage is not to be utilized, both it and the threaded pressure fitting 152 can be eliminated from the device. Attached to the inner cylinder 106 opposite the main riser column body upper head 142 is a riser column stop head 156, attachment being accomplished by means of attaching screws 158. The riser column stop head engages an annular shoulder 160 on the riser column piston 114 so as to limit the upward travel of the riser column. As there is no O-ring to form a seal between the riser column stop head 156 and the riser column 104, the chamber formed between the riser column and the main riser column body inner cylinder, referred to hereinbefore as the atmospheric vented space 118, is vented to the atmosphere by the loose fit form therebetween.

The lower head 120 has a hydraulic fluid transfer passage 164 formed therein, to which is fitted a threaded pressure fitting 164. The threaded pressure fitting 164 is attached to the hydraulic fluid transfer line 82, so as to connect the hydraulic fluid working space 122 of the pedestal assembly with the hydraulic fluid chamber 76 of the linear intensifier. A solenoid operated valve 166 is preferable included in the hydraulic fluid transfer line 82 in order to provide a positive stop upon the transfer of hydraulic fluid between the linear intensifier and pedestal assembly.

The linear intensifier 12 and pedestal assembly 11, as shown in FIGURE 1, are mounted on a base shown as a dolly 170 having wheels 172, 174, mounted in pairs. The wheels 172 are shown as swiveling. Thus, the device 12 may be readily moved from place to place, as necessary or appropriate to accomplish the particular work being carried on.

Referring now to FIGURE 2, there is shown in block diagram form an overall component layout for utilization of the linear intensifier 12 and pedestal assembly 11 of FIGURE 1. As shown in FIGURE 2, compressible fluid from a compressible fluid source (not shown) is applied to an auxiliary supply connection 201 through a high pressure inlet indicated by an arrow 202. A readily available and comparatively inexpensive compressible fluid which is utilized with the apparatus of the invention is nitrogen, although other fluids can be used. Nitrogen has the advantage of being inert, so as not to introduce an explosion hazard. An auxiliary supply shut-off valve 203 is connected to the auxiliary supply connection 201 by a high pressure connector 204. The auxiliary supply shut-off valve may be, for example, a conventional high pressure on-off type valve. An internal supply tank 205 is connected to the auxiliary supply shut-off valve 203 through an auxiliary supply high pressure line 206 and an internal supply high pressure line 207, which meet at a supply junction connection 208. An auxiliary vent valve 209 and an internal supply vent valve 210 enable the compressible fluid storage and supply system to be vented. A supply pressure gauge 211 indicates the available pressure of a compressible fluid to be supplied to the system, that is, the compressible fluid pressure at the supply junction connection 208. A system shut-off valve 212 is connected to the supply junction connection 208 by a high pressure connector 213. Opening the system shut-off valve 212 applies the compressed fluid to a pressure regulator 214, which serves to provide a constant pressure to the system. A pressure gauge 216 reads the pressure output from the pressure regulator 214, which is applied to the fluid supply valve 218. The fluid supply valve may be a conventional on-off type solenoid actuated valve. The output of compressed fluid from the fluid supply valve 218 is applied to the linear intensifier inlet threaded pressure fitting 50, from which the cap 54, shown in FIGURE 1, has been removed, by a high pressure connector 219. Thus, fluid under pressure is applied to the compressible fluid chamber 40 of the linear intensifier. In FIGURE 2, the transfer threaded pressure fitting 52 of the linear intensifier 12 is connected by means of a fluid connector 221 to a vent control valve 222 which may be, for example, a conventional on-off type solenoid actuated valve. The vent control valve 222 is connected by means of a vent outlet connector 223 to a vent assembly 224. It has been found that a satisfactory vent assembly, which reduces the noise occasioned by the release of high pressure fluid instantaneously on the opening of the vent control valve, is provided by utilizing rubber or other flexible and expansible tubing, into which a plurality of small apertures have been drilled. The open ends of the tubing are closed by stoppers or plugs, so that the compressible fluid, on entering the vent assembly, can only escape through the small apertures. By using expansible material, the vent assembly may expand in diameter to accommodate the sudden in-rush of fluid under pressure, and gradually contract as the fluid escapes through the small apertures. In operation, the hydraulic fluid chamber 76 of the linear intensifier 12 is filled with hydraulic fluid, which communicates through the hydraulic fluid transfer line 82 to the hydraulic fluid storage chamber 122 in the pedestal assembly. Upon the application of high pressure fluid to the compressible fluid chamber 40 of the linear intensifier, the linear intensifier transfer shaft transfers the downward movement of the compressible fluid piston to the hydraulic fluid piston, thus increasing the hydraulic fluid pressure in the hydraulic fluid chamber 76 and, consequently, transferring this increased hydraulic fluid pressure to the hydraulic fluid working chamber 122 of the linear intensifier. An increase in pressure of the hydraulic fluid in the hydraulic fluid working chamber 122 overcomes the residual pressure of the compressible fluid in the compressible fluid storage chamber 116 of the pedestal assembly and thereby forces upward movement of the riser column piston and consequently of the riser column itself and of the load support plate 108. When downward movement of the load support plates is desired, the vent control valve 222 is opened, thereby releasing some of the compressed fluid contained in the compressible fluid chamber 40 of the linear intensifier, so as to reduce the hydraulic fluid pressure and permit the hydraulic fluid piston 20 to rise, resulting in the downward movement of the main riser piston in response to the load carried by the load support plate and the increased pressure of the compressible fluid contained in the compressible fluid storage space 116. In order to readily accomplish the selective upward or downward movement of the load support plate 108, a valve actuation control 226 is provided, which is utilized to selectively actuate the various solenoid valves utilized in the device, as will be explained with respect to FIGURE 3. As shown in FIGURE 2, the load support pedestal 107 is carrying a camera 230.

As is shown in FIGURE 3, the valve actuation control may consist simply of a double-throw switch 226 connected so as to selectively actuate either the fluid supply valve 218 or the vent control valve 222, but, upon the actuation of either valve, to also actuate the solenoid operated valve 166 which is disposed in the hydraulic fluid transfer line 82. Preferably, the solenoid actuated valve 166 has a slight time delay in its operation, in order to assure that a positive pressure differential exists as desired upon opening of the valve to avoid any slight bounce or wiggle in the movement of the riser column. It should be noted that it is not essential to utilize the solenoid actuated valve 166 in the hydraulic fluid transfer line, if the possibility of having slightly irregular operation at the commencement of movement is not objectionable for the particular application of the device.

Referring now to FIGURE 4, there is shown an alternate embodiment of the invention in which the compressible fluid chamber 40 of the linear intensifier is connected to the compressible fluid storage space 116 of the pedestal assembly. Thus, in FIGURE 4, a high pressure connector 240 is connected between the transfer threaded pressure fitting 52 of the upper body cylinder assembly 14 and the threaded pressure fitting 164 of the outer cylinder 102, which connects through the passage 150 to the compressible fluid storage space 116 of the pedestal assembly. The compressible fluid inlet passage 46 of FIGURE 1 is shown in FIGURE 4 as closed by the cap 54 being fitted to the pressure fitting 50. It will be understood, however, that prior to this closure, the compressible fluid chamber 40 is charged with the desired pressure of compressible fluid and, in most instances, the compressible fluid source will not be completely disconnected, but rather closure of the compressible inlet will be accomplished by means of closing the fluid supply valve 218 shown in FIGURE 2, rather than the physical removal of the high pressure connector 219 of FIGURE 2. In addition, in the embodiment of FIGURE 4, a reversible drive electric motor 250 is utilized to drive the linear intensifier pistons upward or downward, as desired, in order to transfer hydraulic fluid from the linear intensifier 12 to the pedestal assembly 11, or vice versa, to accomplish the raising and lowering of the load support plate 108. An embodiment of this drive mechanism is illustrated in FIGURE 5, and is seen to be a rack and pinion type of drive in which the rack 260 is attached to the hydraulic fluid piston 20 and has an arm 262 which rides against the upper body cylinder assembly 14 so as to act as a guide. Only a portion of the mechanism is shown, and it will be understood that in most instances, the application of the moving force from the rack 260 to the piston 20 will be accomplished by utilizing several legs of the type illustrated by the rack 260, but without the rack drive feature, disposed at various points on the piston 20, so as to distribute the load more equally. The rack 260 is driven by a pinion 264, which, in turn, is driven by a reversible drive electric motor (not shown in FIGURE 5, see FIGURE 4). The direction of drive of the electric motor 250 of FIGURE 4 may be controlled, for example, by the valve actuation control system of FIGURE 3, in which the valves 218, 222 are replaced by the reversible drive feature of the electric motor 250.

From the foregoing, it will be apparent that the invention provides several arrangements of its basic principle for smooth, quiet, effortless positioning of the column without manual lifting or pushing or an arrangement for manual positioning.

The basic principles of the invention's operation are as follows:

(1) Compressible fluid in small volume is applied to change the pressure of hydraulic fluid in a linear intensifier in order to move a riser column up.

(2) Removal of compressible fluid from the linear intensifier lowers the column.

In its most elementary embodiment, compressible fluid supplied by hose from an auxiliary source or from rechargeable pressure vessels mounted on the device's base structure is directed to an adjustable pressure regulator, then to a normally closed solenoid valve connected to the compressible fluid area of the linear intensifier. Actuation of an "up" switch allows the compressible fluid to move a hydraulic intensifier piston, causing the column to rise in response to the resulting increase in hydraulic pressure. Another normally closed solenoid operated valve is connected to the compressible fluid chamber of the linear intensifier and the "down" position of the switch. Actuation of the down switch releases the compressible fluid to atmosphere through a sound suppressing muffler. Maximum raising velocity is variable through the setting of the adjustable pressure regulator.

This arrangement allows the column to coast in the up or down direction until reaching a stop position, at which the pressure of the compressible fluid is balanced with the hydraulic fluid pressure resulting from the weight of the load, in this case the camera and associated structure.

Non-coasting stops can be achieved by operation of the compressible fluid supply or vent valves to effect pressure balance, by brief operation of the valve whose operation opposes the direction of movement.

To assure adequate compressible fluid for any sequence of operaitons, a compressible fluid pressure gauge showing the pressure available in the supply pressure level is used.

Some operators prefer a positive stop of the up or down travel upon release of the up or down switch. This is achieved by the addition in the hydraulic fluid transfer line 82 of a normally closed solenoid fluid valve which is connected to the up or down switch positions.

In the foregoing, the arrangement of the area above the riser column piston is vented to atmosphere.

In a further embodiment, for manual movement up or down, the compressible fluid storage space 116 of the pedestal assembly is sealed and connected to the compressible fluid chamber 40 of the linear intensifier. This space is then pressurized with compressible fluid to a pressure in excess of any pressure to be applied through the maximum load placed on the riser column. This compressible fluid pressure is applied directly to the opposite side of the riser column piston so that it opposes the hydraulic fluid pressure applied to the bottom of the riser column piston, thus creating a static balanced force unchanged by any weight on the riser column.

The compressible fluid supply system is no longer required, except for applying the initial charge and the movement of the riser column is achieved by applying manual pressure.

Stopping and holding against unintentional forces being applied to the riser column is effected by the same solenoid operated normally closed valve in the hydraulic fluid line from the linear intensifier to the hydraulic fluid chamber of the pedestal assembly.

In this embodiment, it is essential that the cross-sectional areas of the compressible fluid chamber of the pedestal assembly and the compressible fluid chamber of the linear intensifier are selected so that movement of the riser column piston and compressible fluid piston produce equal changes in volume in order to maintain a static balance on both sides of the riser column piston in any position of the riser column.

The camera operator, to manually position the camera, needs only to actuate the switch to open the normally closed valve in the hydraulic fluid line and apply manual pressure up or down until the riser column is positioned, then release the switch to secure its position. A further modification of this embodiment utilizing powered operation has already been described (FIGURE 5).

The invention claimed is:
1. In combination,
(a) a linear intensifier having a dual cylinder assembly which includes
a first cylinder within which is disposed a compressible fluid piston so as to form a compressible fluid chamber, and
a second cylinder of substantially larger diameter than the first cylinder within which is disposed a hydraulic fluid piston so as to form a hydraulic fluid chamber, said two pistons being interconnected to move in unison;
(b) a pedestal assembly having
a first outer cylinder,
a second inner cylinder disposed concentrically within said first cylinder,
a load-bearing cylindrical riser column disposed in the space between said first and second cylinders, and
a riser column piston connected to the riser column and disposed between said first and second cylinders so as to form a first fluid working chamber between the first and second cylinders, and a second fluid chamber and a third fluid chamber between the riser column and the first and second cylinders respectively, and means for sealing the first chamber;
(c) a hydraulic fluid transfer passage communicating between the first fluid chamber of the pedestal assembly and the hydraulic fluid chamber of the linear intensifier; and
(d) compressible fluid chamber pressure control means.

2. The combination of claim 1, and in which the pedestal assembly includes means for sealing the second fluid chamber.

3. The combination of claim 1 and in which the compressible fluid chamber pressure control means includes
a source of compressible fluid at a pressure in excess of the pressures of the hydraulic fluid and compressible fluid in the linear intensifier;
a compressible fluid inlet in the linear intensifier in communication with the compressible fluid chamber; and
actuation means for selectively applying fluid from the compressible fluid source to the compressible fluid inlet.

4. The combination of claim 2 in in which the compressible fluid chamber pressure control means includes
a source of compressible fluid at a pressure in excess of the pressures of the hydraulic fluid and compressible fluid in the linear intensifier
a compressible fluid inlet in the linear intensifier in communication with the compressible fluid chamber; and
actuation means for selectively applying fluid from the compressible fluid source to the compressible fluid inlet.

5. The combination of claim 3 and in which the compressible fluid chamber pressure control means includes
a sound suppressing muffler formed of elastic material in a hollow, substantially sealed shape and having a plurality of small apertures extending therethrough, and
actuation means for selectively releasing compressible fluid chamber into the muffler.

6. The combination of claim 4 and in which the compressible fluid chamber pressure control means includes
a sound suppressing muffler formed of elastic material in a hollow, substantially sealed shaped and having a plurality of small apertures extending therethrough, and
actuation means for selectively releasing compressible fluid from the compressible fluid chamber into the muffler.

7. The combination of claim 2 and including fluid transfer control means operable to normally close the hydraulic fluid transfer passage and to open said passage in a pre-selected time relationship with respect to actuation of the compressible fluid chamber pressure control means.

8. The combination of claim 3 and including fluid transfer control means operable to normally close the hydraulic fluid transfer passage and to open said passage in a pre-selected time relationship with respect to actuation of the compressible fluid chamber pressure control means.

9. The combination of claim 4 and including fluid transfer control means operable to normally close the hydraulic fluid transfer passage and to open said passage in a pre-selected time relationship with respect to actuation of the compressible fluid chamber pressure control means.

10. The combination of claim 7, and in which the compressible fluid chamber pressure control means includes
a reversible drive means attached to the linear intensifier to move the hydraulic and compressible fluid pistons mechanically in unison,
means for selecting the direction of drive of the reversible drive means,
means for energizing the reversible drive means, and
a compressible fluid transfer passage communicating between the second fluid chamber of the pedestal assembly and the compressible fluid chamber of the linear intensifier.

References Cited

UNITED STATES PATENTS

| | | | |
|---|---|---|---|
| 2,356,899 | 8/1944 | Stutter | 92—108 |
| 1,903,887 | 4/1933 | Widener. | |
| 1,920,285 | 8/1933 | Wilkins et al. | |
| 2,032,185 | 2/1936 | Sciaky. | |
| 2,152,715 | 4/1939 | Van Cleave. | |
| 2,165,095 | 7/1939 | Frechette. | |
| 2,403,912 | 7/1946 | Doll. | |
| 2,490,323 | 12/1949 | Pounds. | |
| 2,540,347 | 2/1951 | Pounds | 60—57 |
| 2,612,142 | 9/1952 | Smith. | |

MARTIN P. SCHWADRON, Primary Examiner

ROBERT R. BUNEVICH, Assistant Examiner